United States Patent [19]

Singh

[11] 4,089,905

[45] May 16, 1978

[54] METHOD FOR THE PREPARATION OF POLYTHIOETHERS FROM THIODIETHANOL USING HETEROGENEOUS MIXED METAL OXIDE CATALYSTS

[75] Inventor: Ajaib Singh, Somerville, N.J.

[73] Assignee: American Cyanamid Company, Stamford, Conn.

[21] Appl. No.: 736,023

[22] Filed: Oct. 27, 1976

[51] Int. Cl.$^2$ ............................................. C07C 148/00
[52] U.S. Cl. .............................. 260/609 R; 260/609 F
[58] Field of Search ............ 260/609 R, 609 F, 615 B

[56] References Cited

U.S. PATENT DOCUMENTS

| | | | |
|---|---|---|---|
| 2,518,245 | 8/1950 | Morris et al. | 260/609 R |
| 2,562,583 | 7/1951 | Schulz et al. | 260/465.2 |
| 2,668,175 | 2/1954 | Reppe et al. | 260/465.2 |
| 2,830,072 | 4/1958 | Garritsen et al. | 260/465.2 |
| 3,043,860 | 7/1962 | Phillips et al. | 260/465.2 |
| 3,163,620 | 12/1964 | von Brachel | 260/609 R |

FOREIGN PATENT DOCUMENTS 1,510,914  11/1966  France ........................... 260/615 B

OTHER PUBLICATIONS

JACS, 74, 4076–4079, F. Richter et al., (1952).
Union Carbide, Application Bulletin F-5764D, Oct. 1965.

*Primary Examiner*—Joseph Paul Brust
*Assistant Examiner*—Molly C. Eakin
*Attorney, Agent, or Firm*—Frank M. Van Riet

[57] ABSTRACT

The preparation of polythioethers by the polycondensation of thiodiethanol in the presence of a heterogeneous mixed metal oxide catalyst.

7 Claims, No Drawings

METHOD FOR THE PREPARATION OF POLYTHIOETHERS FROM THIODIETHANOL USING HETEROGENEOUS MIXED METAL OXIDE CATALYSTS

This invention relates generally to the preparation of polythioethers, and more particularly to the preparation of polythioethers by the polycondensation of thiodiethanol in the presence of a heterogeneous mixed metal oxide catalyst.

Thiodiethanol is a well known diol, the hydroxyl groups of which exhibit unusual reactivity because of their positioning beta to a sulfur atom in an aliphatic chain. In the polycondensation of thiodiethanol in the presence of p-toluene sulfonic acid, or sulfuric acid, or any of the other commonly used etherifying catalysts, the side reactions which occur, mainly by ring closure, are sufficiently great as to severely limit the yields of the polycondensate to about 40 to 60%. These cyclic by-products include large amounts of thioxane and some dithiane, both of which have an extremely unpleasant odor.

Schmelzer et al, in their U.S. Pat. No. 3,312,743, addressed themselves to this problem and found that phosphorous acid, or certain of its derivatives, used in catalytic amounts, for example about 0.05 to 10 percent by weight, appreciably minimized the problems of excessive by-product formation.

I have found that phosphorous acid is indeed quite effective in minimizing cyclic by-product formation during the preparation of relatively low molecular weight oligomers of thiodiethanol, such as those suitable for use in the preparation of polyurethanes. However, in subsequent reactions of these oligomers with isocyanates I have found, as Schmelzer et al recognized, that the acidic residues, if left behind, cause problems. They must, therefore, be removed.

Removing phosphorous acid residues from polythiodiethanol oligomers is tedious, time consuming and expensive. The polymers may be washed, or treated with a base to form insoluble inorganic salts, for example by treating with ammonia or lime, and the salts filtered or centrifuged out. If excess base remains after the treatment it may also lead to problems in subsequent reactions with isocyanates. As a result of these problems phosphorous acid, while an excellent catalyst, in terms of promoting polycondensation shares the disadvantages of other commonly used homogeneous acid etherifying catalysts in terms of the characteristics of the polymeric product.

In an effort to find means to effectively catalyze the condensation of thiodiethanol and to avoid or minimize the aforementioned problems, I conducted experiments which led to our discovery that certain heterogeneous, acid-acting, mixed metal oxides are excellent catalysts for the condensation, leading to high overall yields of oligomers with minimal cyclic by-product formation. The catalysts, described in more detail below, possess some obvious and some unobvious advantages over previously used homogeneous acid catalysts used for these purposes, including phosphorous acid. They include:

1. Ease of removal from the reaction mixture by simple filtration.
2. Virtually no residual acidity in the polymer after use and removal thereof.
3. Capability of being re-used by a simple regeneration of activity.

Not every heterogeneous mixed metal oxide is useful in the present invention. A great many are known and a great many have been used effectively for the catalysis of other unrelated reactions. For the purposes of the present invention mixed metal oxides are intended to include clays, molecular sieves and ion-exchange compositions, all of which essentially comprise mixtures of alumina and silica as well as minor amounts of other metal oxides, such as calcium oxide, magnesium oxide, boron oxide, molybdenum oxide, tungsten oxide and the like, even though some of the elements thereof, such as boron, may conventionally be regarded as non-metals. Acidic clays are essentially layered silicates which have been given various treatments, such as acid washing, and which may contain alumina. Inorganic ion-exchangers and molecular sieves are combinations of alumina and silica or combinations of silica or alumina with other metal oxides. Acid-acting metal oxides are those which, by virtue of acidic groups on their surface structure, behave as acidic substances. For instance, some which contain sodium ions on their surface may be exchanged with ammonia and the ammonia then eliminated by heating to an elevated temperature, thereby being transformed into acid-acting catalysts.

For the purposes of the present invention I have found that effective heterogeneous, acid-acting, mixed metal oxides are those which satisfy the following activity test:

Activity Test

One gram (1 gram) of the catalyst is slurried in 50 ml. of water for 5 minutes, the catalyst is allowed to settle, and the pH of the aqueous medium measured using a standard pH meter. A second sample of five grams (5 grams) is slurried in 50 ml. of water for 5 minutes, and the pH measurement repeated. If the pH of the aqueous medium of the second sample is the same or lower (more acidic) than the pH of the aqueous medium of the first sample, the catalyst is considered to be effective for the polycondensation of thiodiethanol.

Some heterogeneous mixed metal oxides, when subjected to the above Activity Test, will exhibit an increased pH (become more basic) in the second sample. This effect is illustrated in the examples which follow wherein a zinc alumina catalyst (76% $Al_2O_3$ — 24% ZnO) exhibited an increased pH and was shown to be ineffective in catalyzing the condensation of thiodiethanol.

It will be noted that the expression "acid-acting", as defined by the above-mentioned activity test, does not require that the supernatant liquid from an aqueous slurry be acidic itself, i.e. that it have a pH below 7, but only that the more concentrated slurry give a lower pH than the more dilute slurry. This is illustrated in Examples 6–8 in which the absolute pH values of the catalyst lie above 7, yet the catalyst is acid-acting as defined by the test, and is effective in the practice of the invention.

While applicant does not wish to be bound to any particular explanation for the success of acid-acting catalysts, it is believed that the effectiveness of these catalysts depends on the availability to the reacting organic substances of specific active acidic sites on the heterogeneous catalyst, even though certain other sides on the catalyst may be basic; and the activity test described above is simply a measure of the availability of such active acidic sites.

The polycondensation of thiodiethanol is carried out at temperatures above about 150° C, preferably about 170°–200° C, in the presence of from about 0.5 to 20 weight percent, based on the initial charge of reactants, of the mixed metal oxide catalyst, preferably about 1 to 10 weight percent, same basis. Water formed during the condensation is removed by distillation; a vacuum may be applied to the reaction mixture in the latter stages to effect removal of residual amounts of water. Polymers having molecular weights in the range of about 300 to 4000 are readily obtained, as determined by measurement of the hydroxyl number by conventional methods. A convenient method for monitoring the extent of reaction is to observe changes in the methylene ($CH_2$) to hydroxyl (OH) ratio of an infrared spectrum of the reaction product. The ratio increases as the molecular weight increases and has a good correlation with hydroxyl number. When the reaction is completed the catalyst is filtered while the reaction product is still hot. The acid number of the product is then measured to determine the residual acidity.

The heterogeneous mixed metal oxides are shown to be about as efficient as phophorous acid in terms of yields and reaction time under comparable conditions.

Although the foregoing description of the invention generally relates to the polycondensation of thiodiethanol, it will be understood that copolymers of thiodiethanol with other suitable aliphatic alcohols containing two or more hydroxyl groups are within the scope of the invention. Thus, a major proportion of thiodiethanol will co-condense with saturated and unsaturated diols and triols, such as ethylene glycol, propane-1,2-diol, propane-1,3-diol, butane-1,4-diol, hexane-1,5-diol, diethylene glycol, trimethylolpropane, cyclohexane-1,4-dimethanol, the monoallyl ether of trimethylol propane, and the like.

The examples which follow will further illustrate the invention.

EXAMPLE 1

Evaluation of Acidity of Mixed Metal Oxides

The catalysts described below and in Table I were tested for activity in accordance with the aforementioned Activity Test.

Catalysts

A. Silica Alumina (75:25), Davison Div., W. R. Grace.

B. Activated acidic clay, Filtrol Grade #1, Filtrol Corp.

C. Activated acidic clay, Filtrol Grade #13, Filtrol Corp.

D. Silica Alumina (86:13), Davison Div., W. R. Grace.

E. Molybdena Alumina (Mo-1201), Harshaw Chem. Corp. (90% $Al_2O_3$ — 10% $MoO_3$)

F. Zinc Alumina (Zn-0701), Harshaw Chem. Corp. (76% $Al_2O_3$ — 24% ZnO)

G. Tungsten Alumina (W-1801), Harshaw Chem. Corp. (90% $Al_2O_3$ — 10% $WO_3$)

Table 1

Evaluation of Acidity of Mixed Metal Oxides

| Catalyst | pH 1 gram/50 ml. | pH 5 grams/50 ml. |
|---|---|---|
| A | 7.9 | 7.4 |
| B | 3.4 | 3.15 |
| C | 3.4 | 3.15 |
| E | 4.9 | 4.4 |
| F | 6.7 | 9.3 |
| G | 5.7 | 5.5 |

EXAMPLE 2

Preparation of Polythiodiethanol

Thiodiethanol (1224 grams, 10 moles) and 61.25 grams (5% by weight) of silica alumina catalyst (75:25 Davison Div., W. R. Grace) were heated to 190° C and reacted for 5.3 hours, distilling water as formed in the reaction. A total of 237 ml. of distillate was recovered, of which 55 ml. was an oil. The polymer had a hydroxyl number of 86.4, molecular weight 1300. Based on total distillate the yield of polymer was 81%. The oil represented 4.5% of the initial charge and consisted largely of 1,4-thioxane with minor amounts of other volatile compounds. The catalyst was filtered off and the acid number of the polymer determined to be 0.26, indicating a very low level of residual acidity.

EXAMPLES 3–19

Following the procedure of Example 2, thiodiethanol was condensed with the mixed metal oxides shown in Table II.

EXAMPLE 20

Comparative

Preparation of Polythiodiethanol Using Phosphorous Acid Catalyst

The procedure of Example 2 was followed except that 0.5 percent by weight of phosphorous acid was used as catalyst and the reaction was conducted for 3.5 hours at 180° C. A polythiodiethanol was obtained having a hydroxyl number of 110, molecular weight 980. Total distillate was 19.1% of the total charge (81% yield). The oil represented 4.9% of the initial charge. The acid number of the polymer was 6.2.

EXAMPLE 21

Comparative

When the procedure of Example 20 was followed except for a reaction time of 6 hours at 180° C a total distillate of 21.2% was obtained (about 79% yield). The oil represented 4.9% of the initial charge. The polymer had a hydroxyl number of 38, representing a molecular weight of 2900, and had an acid number of 4.9.

EXAMPLE 22

Comparative

The procedure of Example 2 was followed except that 0.2 percent by weight of p-toluenesulfonic acid was used as catalyst and the reaction was conducted for 5.5 hours at 190° C. A total of 29.4% distillate was obtained (70.6% yield of polymer) of which the oily layer represented 15% of the initial charge. The polymer had a hydroxyl number of 58.5 (molecular weight 1900) and an acid number of 3.8.

Table II

| Exp. No. | Catalyst | Weight % | Polymerization Conditions Time Hrs. | Temp. °C | Distillate formed, as % of initial charge Total | Oil | OH No. | Mol. Wt. | Acid No. |
|---|---|---|---|---|---|---|---|---|---|
| 3 | C | 10 | 4.5 | 170–190 | 24.6 | 11.0 | 370 | 310 | 0.12 |
| 4 | B | 10 | 4.0 | 190 | 35.0 | 19.6 | 160 | 700 | 0.07 |
| 5 | D | 2 | 15.5 | 190 | 25.0 | 9.8 | 114 | 980 | 0.25 |
| 6 | A | 2 | 15.0 | 190 | 18.3 | 4.1 | 135 | 830 | |
| 7 | A | 10 | 6.5 | 180 | 18.8 | 4.9 | 137 | 820 | |
| 8 | A | 10 | 2.0 | 200 | 19.4 | 3.8 | 119 | 940 | |
| 9 | D | 5 | 10.0 | 180 | 27.2 | 9.9 | 72 | 1560 | |
| 10 | E | 5 | 11.0 | 180–200 | 23.7 | 8.3 | 195 | 575 | |
| 11 | F | 5 | 3.0 | 200 | Very little reaction | | | | |
| 12 | G | 5 | 12.0 | 200 | 18.3 | 5.4 | 149 | 730 | |
| 13 | A | 5 | 3 | 200 | 20.0 | 5.9 | 83 | 1350 | |
| 14 | A * | 5 | 5.5 | 200 | 20.6 | 6.0 | 113 | 1000 | |
| 15 | A ** | 5 | 10.0 | 190 | 33.0 | 16.4 | 27 | 4100 | |
| 16 | A ** | 5 | 4.5 | 190 | 23.2 | 6.8 | 94 | 1120 | |
| 17 | A ** | 5 | 4.75 | 190 | 23.4 | 7.6 | 75 | 1500 | |
| 18 | A ** | 5 | 5.15 | 190 | 25.0 | 8.2 | 38.6 | 2900 | |
| 19 | A ** | 5 | 5.3 | 190 | 29.0 | 10.0 | 37.6 | 3000 | |

* Re-used after washing with acetone and drying
** Re-used after washing with acetone, drying and sintering for 2 hours at 400° C Examples 20–22 illustrate that phosphorous acid is an effective catalyst, affording polymers in high yields with minimal by-product formation, but with high residual acidity, and that p-toluenesulfonic acid, a commonly used acid etherifying catalyst, affords lower yields of polymer, excessive by-product formation and high residual acidity.

I claim:

1. A method for the preparation of polycondensation oligomers of thiodiethanol with a molecular weight of about 300 to about 4100 which comprises condensing thiodiethanol or a mixture of a major proportion of thiodiethanol and one or more aliphatic diols at a temperature ranging from about 150° to about 200° C in the presence of about 0.5 to 20 percent by weight of a heterogeneous, acid acting, metal oxide catalyst consisting essentially of silica-alumina; admixtures of silica, alumina, or silica-alumina with calcium oxide, magnesium oxide, boron oxide, molybdenum oxide or tungsten oxide; acid washed acidic clays or acid acting metal oxides having acidic groups on their surface structure; said metal oxide catalyst being such that the pH of an aqueous slurry of a 5 gram portion of the catalyst in 50 ml. of water after stirring for 5 minutes is the same or lower than the pH of a 1 gram portion of the catalyst in 50 ml. of water after stirring for 5 minutes.

2. A method according to claim 1 wherein said heterogeneous, acid-acting metal oxide catalyst is a silica-alumina catalyst.

3. A method according to claim 2 wherein said silica-alumina catalyst comprises 50–80% silica and 20–50% alumina.

4. A method according to claim 3 wherein said silica-alumina catalyst comprises 75% silica and 25% alumina.

5. A method according to claim 1 in which said heterogeneous, acid-acting metal oxide catalyst is an acid-acting clay.

6. A method according to claim 1 wherein said heterogeneous, acid-acting, metal oxide catalyst comprises from about 70–90% alumina and from about 10–30% of tungsten or molybdenum oxide.

7. A method according to claim 1 wherein said catalyst is present in an amount of about 1 to 5% by weight.

* * * * *